United States Patent [19]

Lowe

[11] Patent Number: 5,032,548
[45] Date of Patent: Jul. 16, 1991

[54] CONSTRUCTION MATERIAL CONTAINING CATALYTIC CRACKING CATALYST PARTICLES

[75] Inventor: George E. Lowe, LaPlace, La.
[73] Assignee: Marathon Oil Company, Findlay, Ohio
[21] Appl. No.: 485,923
[22] Filed: Feb. 27, 1990
[51] Int. Cl.$^5$ .................. C03C 3/118; B01J 29/06; B01J 29/04
[52] U.S. Cl. .................. 501/59; 501/55; 502/63; 502/64; 502/68; 502/407; 106/705; 106/709; 106/737; 106/755
[58] Field of Search .................. 502/60, 62, 63, 64, 502/67, 68, 336, 407, 414; 501/59, 68, 120, 127, 55; 106/76, 78, 89, 97, 705, 709, 737; 423/242 A

[56] References Cited

U.S. PATENT DOCUMENTS

| | | | |
|---|---|---|---|
| 3,118,845 | 1/1964 | Innes et al. | 252/453 |
| 3,535,230 | 11/1968 | Kittrell | 208/60 |
| 4,764,269 | 8/1988 | Edwards et al. | 208/120 |

FOREIGN PATENT DOCUMENTS 38722  3/1982  Japan.

Primary Examiner—William R. Dixon, Jr.
Assistant Examiner—Michael Marcheschi
Attorney, Agent, or Firm—Jack L. Hummel; Jack E. Ebel

[57] ABSTRACT

A composition for use as a road base or levee fill. The composition comprises catalytic cracking catalyst particles in the size range of 1 to 200 microns and a binder the type and amount of which depend on the end use. Hydrated lime is employed as the binder in road base construction while hydrated lime, portland cement, fly ash or mixtures of fly ash and portland cement can be used in levee construction. The catalyst particles are present in amounts of 80% to 96% and the binder is present in amounts of 4% to 20%, both percentage ranges being determiend according to the dry weight of the composition.

12 Claims, 2 Drawing Sheets

CONSTRUCTION MATERIAL CONTAINING CATALYTIC CRACKING CATALYST PARTICLES

FIELD OF THE INVENTION

This invention relates to construction materials which are capable of withstanding the compressive loadings experienced in base layers such as road beds, and which are further capable of withstanding minimal compressive loadings in above-ground constructions such as levee fills while maintaining the cross-sectional shape of the fill. More particularly, it relates to construction materials of this type which comprise catalytic cracking catalyst particles.

BACKGROUND OF THE INVENTION

In petroleum catalytic cracking processes, spent or equilibrium catalyst particles are burned as part of a coke removal process and the resulting stack gases are subjected to caustic scrubbing prior to their emission into the atmosphere. The particles and fluids obtained from the caustic scrubbing process typically have been deposited in a settling pond, with the particles periodically being removed from the pond and disposed of by being blended into surficial soils or buried in land fills. Increasingly, however, the various agencies responsible for controlling the disposal of industrial solid waste are prohibiting these disposal practices. As a result, other disposal methods must be considered.

One way to dispose of catalytic cracking catalyst particles is to use them as an ingredient in other compositions. This would avoid costly disposal practices and in addition give the particles a commercial value of their own. This has already been done to an extent in the use of catalytic cracking catalyst particles as a filler in concrete. The amount of such filler which can be used in a concrete mix is relatively small, however, since cement is the major ingredient in the concrete and since larger size aggregates must also be included.

A preferred end use for catalytic cracking catalyst particles would be one in which large quantities of the particles are required, preferably as the main ingredient of a composition which itself is required to be used in large quantities. A composition useful in the construction industry, for example, would be desirable from the standpoint of the great quantities of particles which would be required. Such an end use would appear highly unlikely, however, since the catalyst particles are so much smaller than the particles which are conventionally used. For example, the bulk of the limestone or gravel used in the base course of a roadway is typically ⅜ inch to ¾ inch in size, whereas the catalyst particles under discussion are in the range of only 1 to 200 microns in size. This great disparity in size is brought int perspective when noting that the upper end of the range of 200 microns corresponds to about 1/128 of an inch. The particles are thus more powderlike in nature in contrast to the much larger particles used in constructing a road base course. The same is true of the material normally employed as fill in the construction of a barrier such as a levee or dike. Powderlike material normally would not be suitable in either type of construction, and if used in a levee fill would be far too permeable.

SUMMARY OF THE INVENTION

The invention provides for utilizing particles of petroleum catalytic cracking catalyst together with a small amount of binder as a composition capable of functioning as a load-bearing layer in environments where it is subjected to compressive loads, such as in a road base or levee. The particles are present in amount, by dry weight of the composition, in the range of 80% to 96%, and the binder is present in the range of 4% to 20%, by dry weight of the composition. Where high compressive strength is not a requirement, as in levee construction, the amount of binder may account for as little as 4% of the composition if a strong binder such as hydrated lime is used or as much as 20% if a weaker binder such as fly ash is used. Intermediate amounts may also be utilized with appropriate binder material or combinations of binders as discussed in more detail hereinafter. Where higher compressive strength is a requirement, as in road base construction, greater amounts of hydrated lime may be used, such as a range of 5% to 10% by weight of the dry composition.

To form the layer, the catalyst particles and binder are mixed and the mixture is compacted in place, preferably at the optimum water content of the mixture.

Other features and aspects of the invention, as well as other benefits thereof, will readily be ascertained from the more detailed description of the invention which follows.

DETAILED DESCRIPTION OF THE PREFERRED EMBODIMENTS

Figure 1:
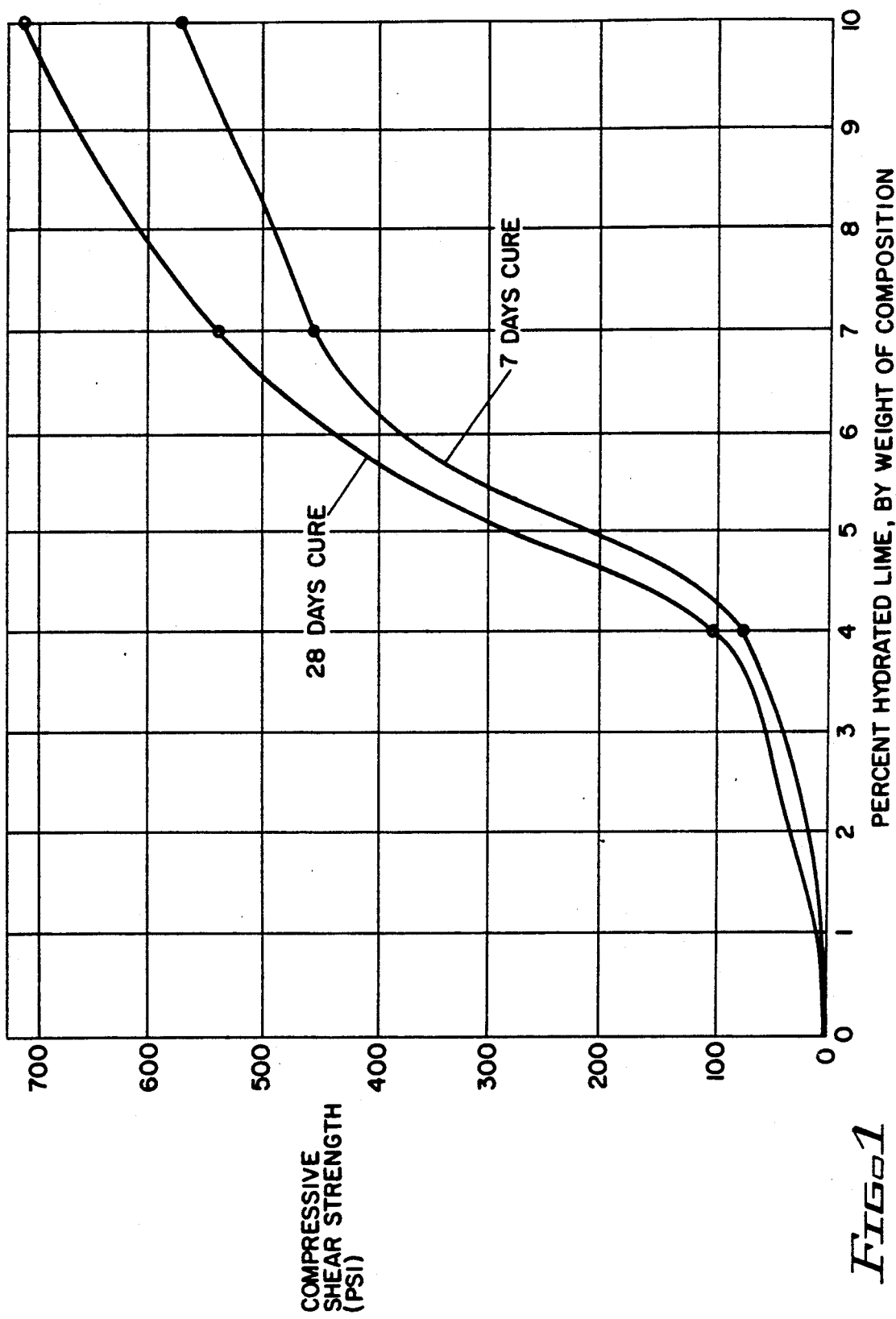
FIG. 1 is a curve showing the relationship of the amount of hydrated lime in the composition of the invention to the compressive strength of the composition.

In accordance with the invention, it has been found that when catalyst fines, comprised of crystalline and amorphous silica and alumina and silica-alumina combinations and measuring 1 to 200 microns in size, are combined with certain binders, they are capable of functioning in certain types of compression load-bearing environments. As mentioned above, catalytic cracking catalyst particles are a by-product of the fluid catalytic cracking process and are readily available from refinery operations. Other sources of such waste products with similar possibilities include mol sieves, HDS catalyst base and other base materials having complex micro structures. Specifically, it has been found that when mixed with hydrated lime the catalyst particles are well suited for such relatively heavy load-bearing usages as road bed bases, and when mixed with fly ash and portland cement, or in minimal amounts with hydrated lime, the particles are well suited for such relatively light load-bearing and shape-retaining usages as levee fill construction. It has further been found that the low permeability of the mixture is particularly useful in levee construction.

To demonstrate the performance of the various compositions of the invention various binders were mixed with the catalyst particles to form samples as follows:

| Binder | Binder, wt % | Particles, wt % |
|---|---|---|
| Hydrated Lime | 4 | 96 |
| Hydrated Lime | 7 | 93 |
| Hydrated Lime | 10 | 90 |
| Fly Ash | 10 | 90 |
| Fly Ash | 20 | 80 |
| Portland Cement | 4 | 96 |
| Portland Cement/Fly Ash | 10 (5 each) | 90 |

Compaction tests were performed on the catalyst particles and on some of the catalyst/binder combinations in accordance with ASTM D-698 to determine the optimum moisture and density levels for samples to be used in unconfined compression tests. Samples were then made up by thoroughly mixing the catalyst particles with the various binders in accordance with the procedures of ASTM D-558 and compacting the material under the optimum moisture and density conditions previously determined in accordance with ASTM D-698. The compacted specimens were then removed from the compaction mold and were placed in sealed poly bags for curing at 73° F., plus or minus 5° F., over varying periods of time. After curing, the specimens were submerged in water for four hours, then subjected to unconfined compression shear tests in accordance with the procedures of ASTM D-1633, Method A.

Samples comprising 4% hydrated lime and 96% catalytic cracking catalyst particles, both percentages being by weight of the total composition, were cured and tested after seven and twenty-eight days. Similar procedures were carried out for samples comprising 7% hydrated lime and 93% catalyst particles and for samples comprising 10% hydrated lime and 90% catalyst particles. The average compressive strength of the samples containing 4% hydrated lime was 75.3 psi when cured for seven days and 98.2 psi when cured for twenty-eight days. The average compressive strength of the samples containing 7% hydrated lime was 455.9 psi for the seven-day samples and 528.7 psi for the samples cured for twenty-eight days. The average compressive strength of the samples containing 10% hydrated lime was 558.4 psi for the seven-day samples and 717.2 psi for the samples cured twenty-eight days.

These compressive strength values are illustrated graphically in FIG. 1, which shows curves representing psi versus percent hydrated lime for the two curing periods of seven and twenty-eight days. The compressive strengths attained make the composition suitable for use as a base layer which is subjected to significant compression loadings, such as a roadway base. For example, for roadways required by regulation to have a compressive strength of at least 250 psi, a figure which can be regarded as typical, the tests show that compositions consisting of about 5% hydrated lime would be suitable. Although the tests do not indicate a definite upper limit to the amount of hydrated lime in the composition, the practical limit is about 10% by weight of the composition. Strengths greater than those provided at this level are not needed for this use. Further, greater amounts of binder would tend to make the composition too costly and would reduce the amounts of catalytic particles that can be disposed of in this manner.

When considering the powderlike quality of the catalytic cracking catalyst particles, it is surprising that strengths of the levels discussed can be attained. The cured compacted composition of catalyst particles and hydrated lime, however, present a hard surface not unlike that of a brick. It is theorized that the extremely large ratio of the surface area of the particles per unit of volume allows a superior mechanical bond between the particles and the binder, which is further enhanced by the rough texture or surface pits of the particles. It is further theorized that there may be an especially strong bond betwen the base hydrated lime (+) and the acidic catalyst particles (−). Whatever the reasons, it is clear that cured mixtures of catalytic particles and hydrated lime provide an economical base material which possesses good compressive strength.

Although the main use discussed for the catalyst-hydrated lime composition has been as a road base, it will be understood that it can be used beneath other surfaces, such as parking lots, which are subjected to similar high compressive loads, or in any soil cement related application. Such compositions may be suitable, for example, as a base layer beneath tennis courts and other outdoor recreational surfaces. It is further contemplated that the mix will be varied so as to best suit the various levels of loading required by the end use.

In addition to the samples containing hydrated lime, other samples using fly ash and portland cement were also made up and tested. Samples comprising 10% fly ash and 90% catalytic cracking catalyst particles, both percentages being by weight of the total composition, were cured and tested after seven and twenty-eight days. Similar procedures were carried out for samples comprising 20% fly ash and 80% catalyst particles and for samples including 10% binder comprised of half fly ash and half portland cement. The average compressive strength of the samples containing 10% fly ash was 10.5 psi when cured for seven days and 14.3 psi when cured for twenty-eight days. The average compressive strength of the samples containing 20% fly ash was 13.2 psi for the seven-day samples and 20.6 psi for the samples cured for twenty-eight days. The average compressive strength of the samples containing 5% fly ash and 5% portland cement was 33.6 psi for the seven-day samples and 38.3 psi for the samples cured for twenty-eight days. In addition, samples were made up containing 4% portland cement and 96% catalytic cracking catalyst particles and were cured for only two days. The average compressive strength of these samples was 13.2 psi.

Figure 2:
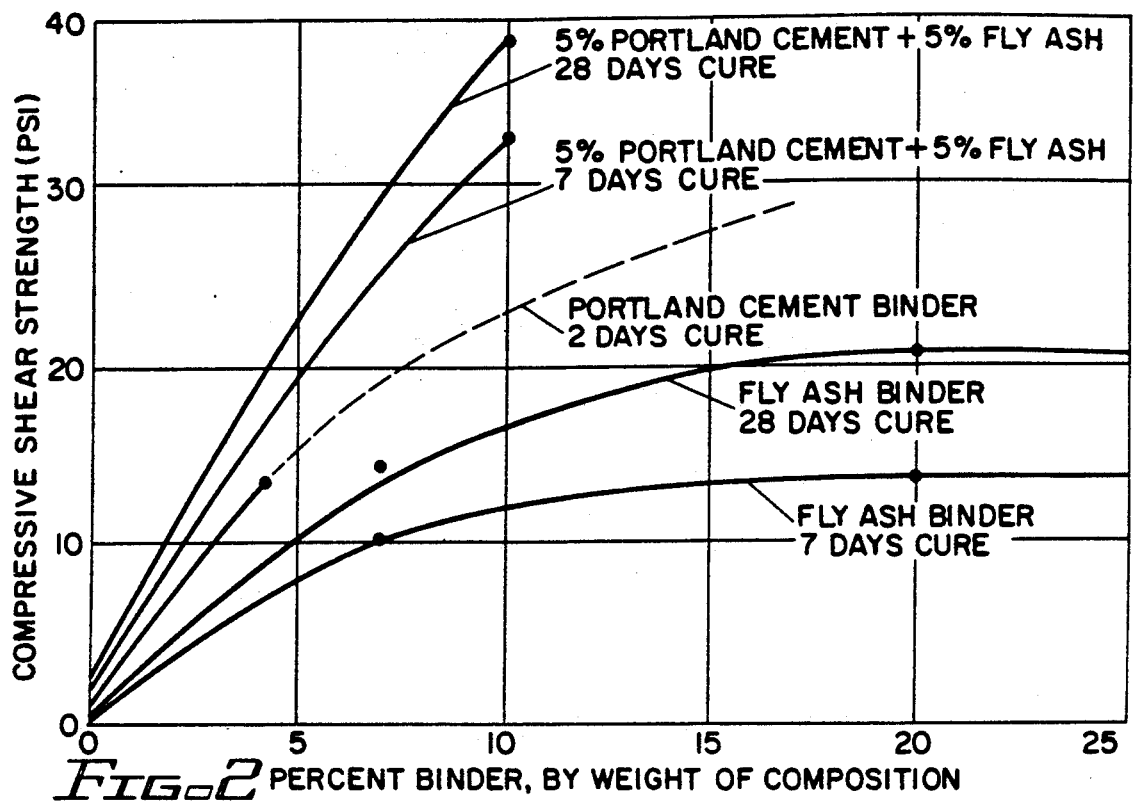
FIG. 2 is a curve showing the relationship of the amount of portland cement, fly ash and combinations of these binder ingredients to the compressive strength of the composition.

These compressive strength values are illustrated graphically in FIG. 2, which shows curves representing psi versus percent fly ash for the two curing periods of seven and twenty-eight days. Because the values of compressive strength mentioned for the cement and the combination cement/fly ash binders are shown only as points on the graph, the curves for the combination cement/fly ash end at the point representing 10% binder. Because the single data point of the curve for the cement binder alone represents only a small amount of binder, a full curve for comparison with the other curves could only be estimated. The estimated portion of this curve is shown in dotted lines. The compressive strengths attained with these compositions are obviously not sufficient to allow them to be used as roadway bases or in any environment requiring the level of compressive strength possessed by the compositions formed from hydrated lime. For applications which require the material to have a minimal amount of compressive strength plus the ability to retain its shape, however, such compositions are well suited for use. An example of such a use is as levee fill material, where the vertical cross-sectional shape of the levee is to be maintained but where only compressive shear strengths in the order of 5 to 7 psi are required. Although the various compositions disclosed are all capable of functioning in this manner, from an economical point of view compositions which either contain too much costly binder or not enough catalyst particles are not likely to be used. The compositions containing more than about 10% fly ash or containing both portland cement and fly ash would fall into this category.

Figure 3:
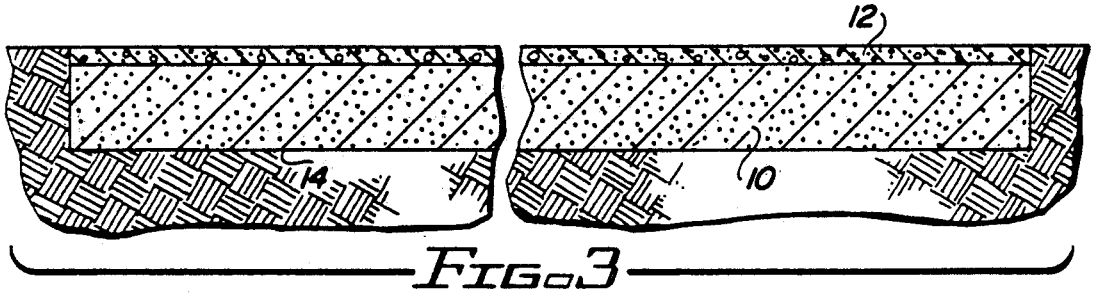
FIG. 3 is a vertical sectional view of a road base incorporating the composition of the invention.

Referring to FIG. 3, the compositions of the invention which are suitable for use in a roadway would be laid down and compacted as the base layer 10. The surface layer 12 for paved roads may be comprised of any suitable material, such as an asphalt pavement, or for unpaved roads, compacted limestone, shell or slag. Typical thicknesses of the base layer may be approximately 12 inches for unpaved roads and 10 inches for an asphalt paved road, with the thickness of the surface layer in such installations typically being 3 inches for unpaved roads and 4 inches for paved roads. Preferably, the mixed catalyst particles and binder should be compacted to at least about 95% of dry density at the optimum water content obtained from ASTM D-698 on a ground surface 14 which has been stripped to a depth of at least 6 inches to remove all vegetation.

Figure 4:
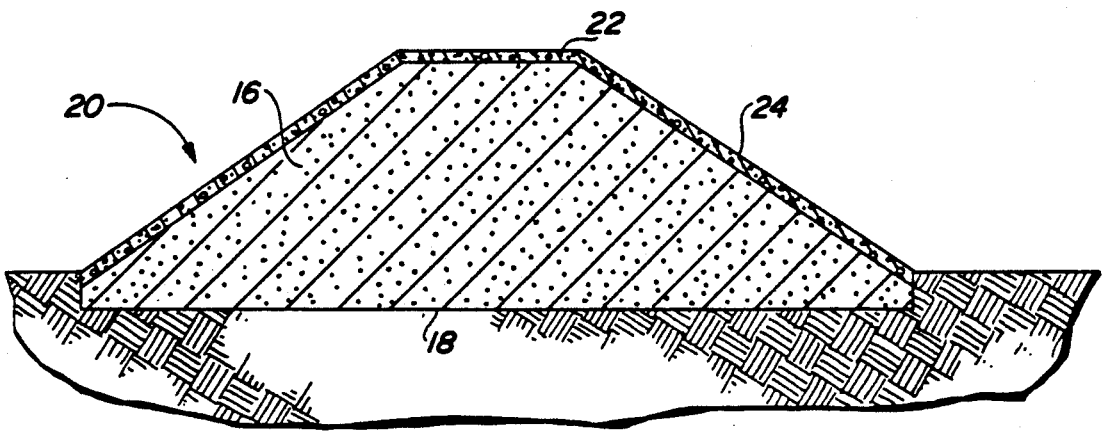
FIG. 4 is a vertical sectional view of a levee incorporating the composition of the invention.

Referring to FIG. 4, the ground should also be stripped in the same manner preparatory to depositing a mixture 16 of catalyst particles and binder on the surface 18 to form a levee 20. Typically, the levee is generally triangular in vertical cross section, with a narrow flat top surface 22. Although the slope of the sides can be less, they are illustrated as being in a horizontal to vertical ratio of 2:1. Because this steep slope may result in erosion problems if the surfaces were not treated, the sides and top are illustrated as being covered with a layer 24 of suitable material such as shell or crushed limestone. If desired, an asphalt spray treatment could be used instead. If the slope is less steep, such as a horizontal to vertical ratio of 3:1, the surface may not need to be covered or treated.

Tests run on different compacted samples formed of catalyst particles and varying types and amounts of binder, one sample containing 4% hydrated lime, one containing 10% fly ash and one containing 4% portland cement, show permeabilities in the order of $1.1 \times 10^{-5}$ to $8.4 \times 10^{-6}$. While this range should result in satisfactory performance, if local regulations require the levee to be even less permeable a liner or further material treatment may be employed. Such procedures are well known in the construction industry and do not form a part of the present invention.

Catalyst particles may readily be prepared for use in the compositions of the invention after being removed from their storage pits or pond. They can simply be placed in storage piles approximately six to eight feet high and preferably not more than about twenty feet in width. After allowing the piles to drain for about four days or longer, depending on weather conditions, the catalyst particles will be ready for mixing with the binder. Mixing may be carried out by any acceptable method, such as by mechanically spreading the binder on the catalyst particles at a predetermined rate, then using any suitable type of mechanical mixer, with water being incorporated in the mixture to ensure the proper moisture content. Compaction may be achieved through use of any suitable means, such as a roller train.

It should now be appreciated that the invention permits the use of bonded catalytic cracking waste material as a base layer subjected to relatively high compression loading and as a shape-retaining fill material useful in environments subjected to low compression loading. It will be understood that the invention is not necessarily limited to all the specific details described in connection with the preferred embodiment but that changes to the compositions and structures disclosed which do not affect the overall basic function and concept of the invention may be made without departing from the spirit and scope of the invention, as defined in the appended claims.

What is claimed is:

1. A composition of material capable of functioning as a load bearing base for compressive loads up to about 717 pounds per square inch of compressive shear strength over which a finish course is applied, comprising:

particles of spent petroleum cracking catalyst, the particles being present in amount by dry weight of the composition, in the range of 80% to 96%;
   the catalyst particles being of size in the range of 1 to 200 microns and being comprised of crystalline and amorphous silica and alumina and silica-alumina combinations; and
   binder uniformly distributed throughout the composition and being present in amount, by dry weight of the composition, in the range of 4% to 20%, said particles and said binder compacted into a mass which is at least about 95% of the maximum dry density at optimum water content of the mixture.

2. The composition of claim 1, wherein said binder is selected from hydrated lime, fly ash, portland cement or mixtures thereof.

3. The composition of claim 2 wherein said compacted mass is used as levee fill.

4. The composition of claim 2 wherein said spent catalyst particles and said binder form a compacted mass with sufficient compressive strength to withstand compressive forces of at least 10 pounds per square inch.

5. The composition of claim 4, wherein said binder comprises hydrated lime, the hydrated lime being present in amount of at least about 4% by dry weight of the material.

6. The composition of claim 4 wherein said binder comprises fly ash, the fly ash being present in amount of at least about 10% by dry weight of the material.

7. The composition of claim 4 wherein said binder comprises portland cement, present in amount of at least about 4% by dry weight of the material.

8. The composition of claim 4, wherein said binder comprises a combination of fly ash and portland cement, the combination binder being present in amount of at least about 10% by dry weight of the material.

9. The composition of claim 2 wherein said binder is cured after the mixture and compaction of the composition.

10. The composition of claim 2 wherein said compacted mass is used as a road bed base.

11. The composition of claim 10 wherein said binder comprises hydrated lime in the range of about 5% to 10% by dry weight of the compacted mass.

12. The composition of claim 11 wherein said compacted mass is capable of bearing loads exerting at least 250 pounds per square inch of compressive shear force.

* * * * *